June 23, 1970  W. H. OWENS  3,517,196
PYROTECHNIC DEVICE FOR INTERRUPTING THE LIGHT
OUTPUT OF A FLASH BULB
Filed Jan. 26, 1968  4 Sheets-Sheet 1

INVENTOR.
WILEY OWENS
BY
*Lockwood D Burton*
ATTORNEY.

INVENTOR.
WILEY OWENS
BY
*Lockwood D. Burton*
ATTORNEY.

June 23, 1970  W. H. OWENS  3,517,196
PYROTECHNIC DEVICE FOR INTERRUPTING THE LIGHT
OUTPUT OF A FLASH BULB
Filed Jan. 26, 1968  4 Sheets-Sheet 3
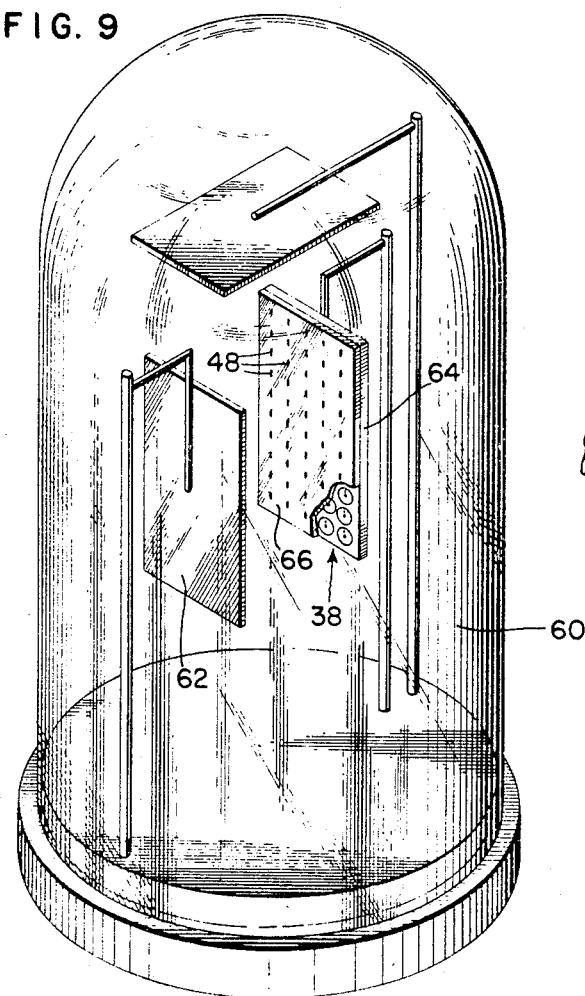
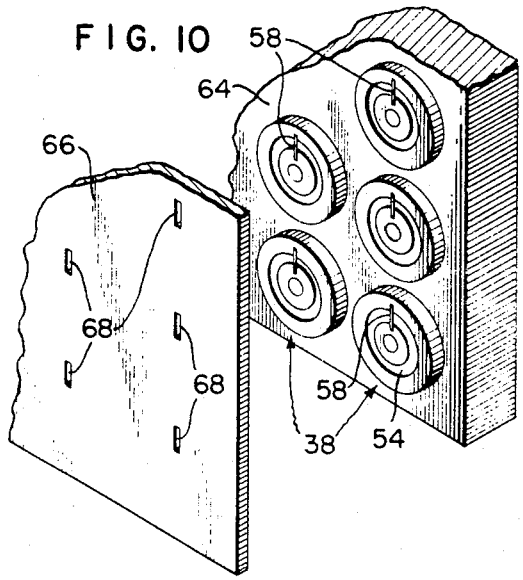
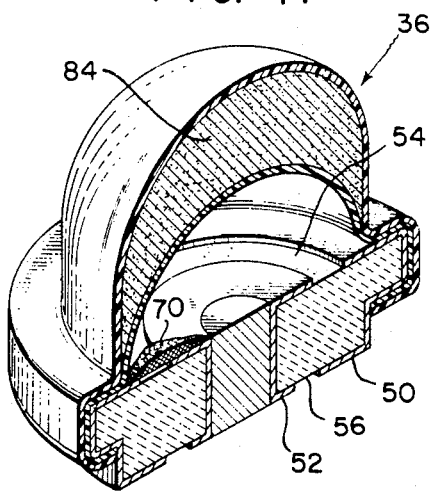
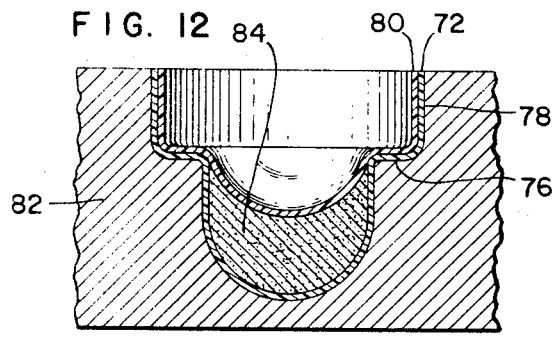
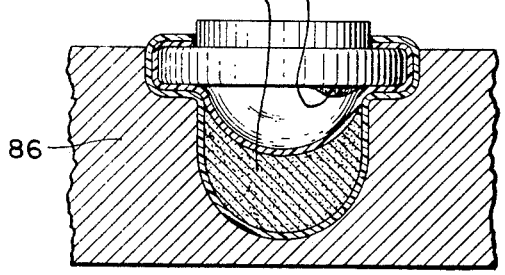
INVENTOR.
WILEY OWENS
BY
Lockwood D. Burton
ATTORNEY.

June 23, 1970  W. H. OWENS  3,517,196
PYROTECHNIC DEVICE FOR INTERRUPTING THE LIGHT
OUTPUT OF A FLASH BULB
Filed Jan. 26, 1968  4 Sheets-Sheet 4

INVENTOR.
WILEY OWENS
BY
Lockwood D Burton
ATTORNEY.

: 
United States Patent Office 3,517,196
Patented June 23, 1970

3,517,196
PYROTECHNIC DEVICE FOR INTERRUPTING THE LIGHT OUTPUT OF A FLASH BULB
Wiley H. Owens, Bloomington, Minn., assignor to Honeywell Inc., Minneapolis, Minn., a corporation of Delaware
Filed Jan. 26, 1968, Ser. No. 700,998
Int. Cl. G03b 9/56, 15/05
U.S. Cl. 250—201                          8 Claims

ABSTRACT OF THE DISCLOSURE

In a photoflash system, means are provided for controlling the effective light output from a flash bulb in accordance with demand. The means include light sensing means responsive to light reflected from the object of the photo. Signals from the sensing means are integrated and used to trigger means for obfuscating the light source. The latter means may include a vaporizable substance, a deflagrating substance or the like which, in response to the trigger signal, forms an opaque shield between the light source and the photographic object.

---

In the art of flash photography, means have heretofore been provided whereby, in the case of electronic flash devices, the time duration of the flash is controlled in accordance with the demand as determined by the film speed, diaphragm opening and distance to the photographic object. Those devices actually quench the flash tube by short-circuiting the flash tube energy source, thereby assuring that the proper amount of light for a good picture is obtained, minimizing the probability of over-exposure.

On the other hand, most tyro photographers use the more conventional flash bulbs. While many efforts have been made to make photography for such users as simple as possible, no comparable means have been provided for bulb-type flash devices. Such tyro photographers are those most in need of aids in making acceptable photographs.

Accordingly, it is an object of the present invention to provide an improved photoflash control means which obviates the foregoing shortcomings.

It is another object of the present invention to provide an improved photoflash device as set forth which is usable with conventional flash bulbs.

It is a further object of the present invention to provide a flash control means for bulb-type flash devices wherein auxiliary means are provided for effectively cutting off the light from the source after a time interval determined by the demand of the conditions.

In accomplishing these and other objects there has been provided, in accordance with the present invention, in association with a photographic camera, a photoflash apparatus including flash bulb means for illuminating an object to be photographed. There is also provided means for sensing the light reflected from the object to the camera, producing a corresponding signal. The latter signal is integrated to produce a control signal. The control signal is, in turn, used to control the actuation of a light cut-off means. The latter means may include means within a specially constructed flash bulb which is effective instantly to blacken the walls of the flash bulb envelope. Alternatively, the latter means may include means external to the flash bulb, but interposed between the flash bulb and the object. The external means then includes a normally transparent member and means substantially instantly to respond to the control signal to render the transparent member opaque. In both of the foregoing alternatives, the cut-off means effectively comprises a signal responsive shutter means for automatically controlling photographic exposure with illumination from flash bulbs while taking ambient light conditions into consideration.

A better understanding of the present invention may be had from the following detailed description when read in connection with the accompanying drawings, in which:

FIGS. 7 through 15 illustrate the various steps in the production of a preferred form of the shutter means in accordance with the present invention.

Figure 1:
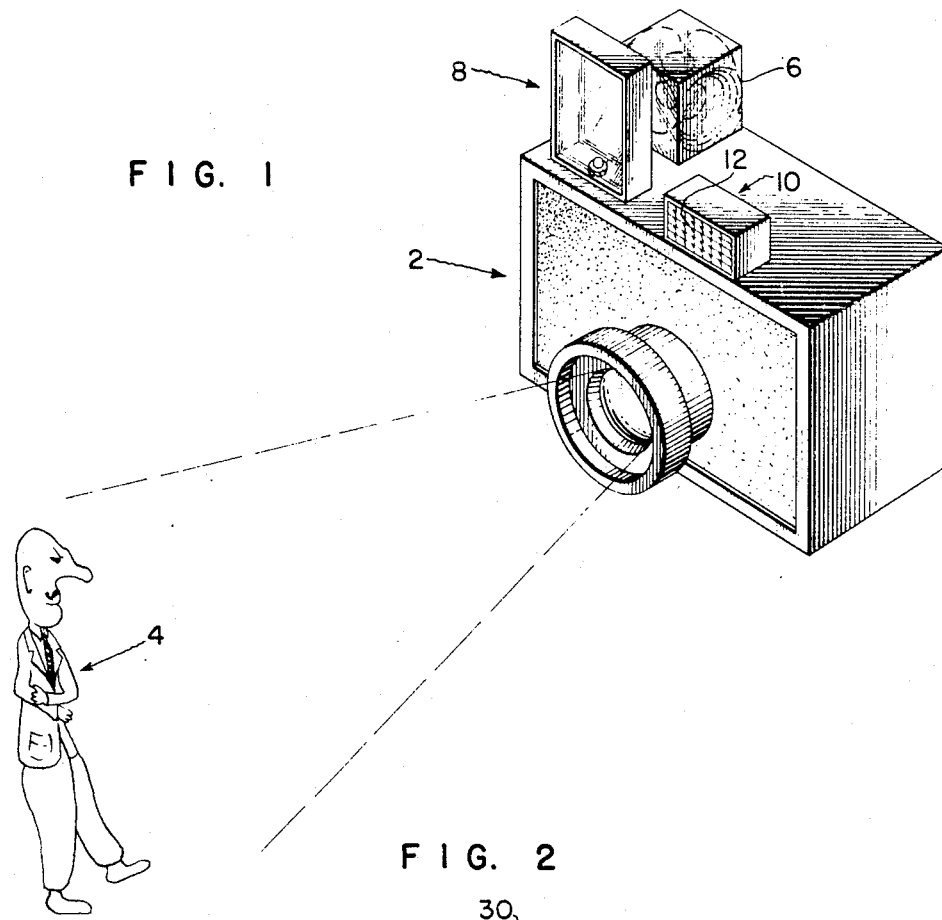
FIG. 1 is a schematic illustration of a photographic system embodying the present invention.

Referring now to the drawings in more detail, there is shown in FIG. 1, a camera 2 with which to take a photograph of an object 4. The camera 2 is of the type adapted to accommodate suitable photoflash apparatus 6 such as the illustrated "flash cube." The so-called "flash cube" is a unitary structure generally in the form of a cube and including a flash bulb and reflector in each of the four vertical faces. These cubes are arranged such that when properly mounted on the camera, one of the vertical faces is aimed in the same direction as the lens of the camera. Upon actuation of the shutter mechanism of the camera, power is supplied to the flash cube from a power supply contained within the camera to cause the flash bulb in the front face of the cube to be flashed in synchronism with the operation of the camera shutter. Under ordinary circumstances, the light from the flash cube 6 would illuminate the object 4 while the shutter of the camera 2 is opened. Light reflected from the object 4 passes through the lens of the camera 2 and exposes the film within the body of the camera. Interposed between the flash cube 6 and the object 4 there is a shutter 8. The shutter 8 is, by means which will be hereinafter described in detail, operative under control conditions to interrupt the flow of light from the flash cube to the object when a predetermined amount of light has been reflected by the object back to the camera. In order to effect the desired control over the actuation of the shutter 8, a light responsive control means 10 is provided. The control means 10 includes a suitable photocell 12, or other suitable light detecting instrumentality, connected in an electronic circuit which is adapted to produce a control signal in response to the integral of the amount of light detected by the photocell to actuate the shutter 8.

In operation, the photographer actuates the shutter of the camera 2 in order to take a photograph of the object 4. In the usual manner, the operation of the camera shutter closes a synchronizing switch which allows the flash bulb 6 to be energized from a power source contained within the body of the camera. The light emitted from the flash bulb 6 passes through the framework of the shutter 8 toward the object 4. Light reflected from the object 4 not only passes through the lens of the camera onto the film therein, but also onto the photocell 12 of the control means 10. Within the control means 10 there is provided suitable circuitry for integrating the signal produced by the reflected light on the photocell 12. When the integrated signal reaches a predetermined value, the control means produces a trigger signal which actuates the shutter 8. Actuation of the shutter 8 produces a substantially instantaneous opacity, blocking the passage of light from the flash bulb 6 toward the object 4. The predetermined value at which the trigger signal is produced is established at that level whereat sufficient light has been received at the camera to produce a proper exposure of the film within the camera. The value is, of course, a function of the film speed and the aperture, or lens opening. Since the light quantity detected by the photocell 12 and measured by the control means 10 is an absolute value, the photographer need not be concerned with camera to object distance (within the normal range of the flash bulbs), the ambient light, nor the reflectivity of the object. Most of the cameras designed for use by the class of photographers for which the present invention is intended have a preset lens opening. The only variable remaining for which the tyro photographer must make adjustments in the control means of the present invention is film speed.

Figure 2:
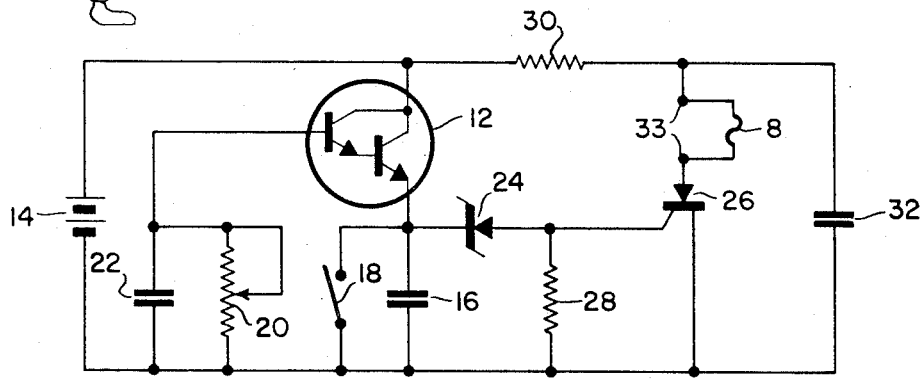
FIG. 2 is a schematic circuit diagram of a control circuit useful in the practice of the present invention.

In FIG. 2, there is shown a schematic representation of a circuit suitable for use in the control means 10. This circuit includes a power supply 14 which, for example, may be the power supply or battery pack contained within the body of the camera and which is also used to fire the flash bulb 6. The photocell 12 is illustrated as a photosensitive transistor in a so-called Darlington configuration. This photocell is characterized in that the current flowing through the cell is controlled in accordance with the amount of light impinging thereon. The collector of the photosensitive transistor combination is connected to the positive terminal of the power supply 14. The emitter of the photosensitive transistor 12 is connected through an integrating capacitor 16 to the other terminal of the power supply 14. A switch 18 is connected across the electrodes of the integrating capacitor 16. Base bias for the transistor 12 is provided by an adjustable resistor 20 connected in series between the base electrode of the transistor 12 and the negative side of the power supply 14. A filter capacitor 22 is connected across the resistor 20. The emitter of the transistor 12 is connected through a Zener diode 24 to the gate electrode of a silicon controlled rectifier 26. A bias resistor 28 is connected between the gate electrode of the silicon controlled rectifier 26 and the negative side of the power supply. The cathode of the silicon controlled rectifier 26 is also connected to the negative side of the power supply. A blocking resistor 30 is connected between the positive side of the power supply and a first electrode of a storage capacitor 32; the other electrode of the capacitor 32 is connected to the negative side of the power supply 14. A pair of output terminals 33 are connected, respectively, to the anode of the silicon controlled rectifier and the junction between the resistor 30 and a storage capacitor 32. Across these output terminals 34 there is connected the shutter means 8 which is here shown as a fusible metallic element.

In operation, the switch 18 is normally closed short circuiting the capacitor 16. This switch may be synchronized to open with the shutter of the camera. As the camera shutter opens, the flash bulb is fired, illuminating the object of the photograph. Light reflected from that object falls upon the photocell 12 causing current to flow through the cell 12 in accordance with the intensity and duration of the light incident thereon. This current flowing through the cell 12 charges the capacitor 16. As the capacitor 16 charges, the voltage thereacross increases until it reaches the breakdown potential of the Zener diode 24. When the Zener diode 24 breaks down, a signal is applied on the gate electrode of the silicon controlled rectifier 26.

In the static condition, the capacitor 32 is fully charged from the power supply 14 through the resistor 30. As the triggering signal is applied to the gate electrode of the silicon controlled rectifier 26, the silicon controlled rectifier is caused to conduct. The conduction of the SCR 26 causes the capacitor 32 to be discharged through the shutter member 8. That current is sufficient to actuate the shutter member 8.

It should be apparent that a predetermined amount of light reflected from the object of the photograph is necessary to effect a triggering of the silicon controlled rectifier. This quantity of light is, of course, correlated with the amount of light necessary to properly expose the film in the camera. Since various film speeds are available even for inexpensive cameras, it is desirable that the rate of charging the capacitor 16 be adjustable to accommodate such variations in film speed. In this circuit, the control over the charging rate of the capacitor 16 is effective by adjusting the base bias on the transistor 12 by means of the adjustable resistor 20.

The shutter means itself may take any of a number of forms all of which are responsive to the signal generated by the control means 10. In its simplest form suggested in FIG. 2 the shutter means 8 is a fine wire of vaporizable material positioned adjacent the flash bulb. When the wire is energized with the pulse of current from the control means 10, the substance of the wire vaporizes, depositing a thin layer of the substance of the wire on the external surface of the flash bulb 8 That thin layer deposited upon the surface of the flashbulb 6 acts as a shutter, operating under controlled conditions to block a further transmission of light from the flashbulb 6 toward the object of the photograph.

Figures 3, 4:
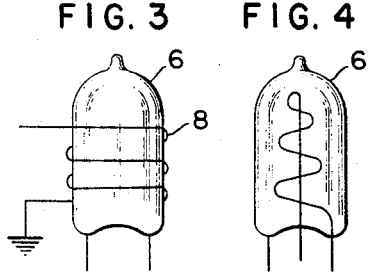
FIG. 3 is a representation of a flash bulb with one form of shutter means in accordance with the present invention.
FIG. 4 is a representation of a flash bulb with another form of shutter means in accordance with the present invention.

In FIG. 3, the shutter means 8 is shown as a vaporizable wire arranged with several turns of the wire wrapped about the external surface of the flashbulb 6. The added turns of the wire would provide a more uniform distribution of the deposit of the vaporized substance of the wire over the external surface of the flashbulb 6.

In FIG. 4, the shutter is shown as a vaporizable wire positioned within the envelope of the flashbulb 6. With this arrangement, actuation of the shutter results in a deposit of the vaporized substance of the wire on the inside surface of the flashbulb, also effectively cutting off the flow of light toward the object.

Figure 5:
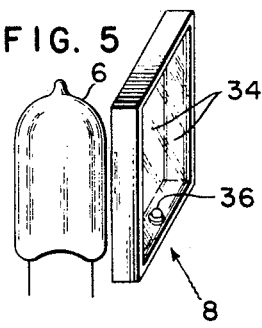
FIG. 5 is a representation of a flash bulb with a further form of shutter means in accordance with the present invention.

A preferred form of the shutter is illustrated in FIG. 5 wherein the shutter member 8 comprises a normally transparent member positioned between the flash bulb 6 and the object of the photograph, and including means for rendering the normally transparent member substantially opaque. The shutter member 8, in this instance, comprises a first and second transparent sheet member 34 defining two opposite walls of a closed chamber. These transparent sheet members 34 may be formed of a suitable clear plastic. The remaining walls 36 of the structure defined in the closed chamber may be made of any suitable nonconductive material. Within the chamber thus defined and along one of the sidewalls, preferably the bottom, there is positioned a pyrotechnic element 36. This pyrotechnic element may again be a vaporizable wire member. However, in a preferred form, the pyrotechnic element is a deflagrating substance or a combination of a deflagrating substance and a dispersible substance. In each of these devices the integration of the signal from the light sensitive element commences with the actuation of the camera shutter. As the integrated signal reaches a predetermined value, the pyrotechnic shutter is actuated to prevent the remaining light output from the flashbulb from influencing the photograph.

Figure 6:
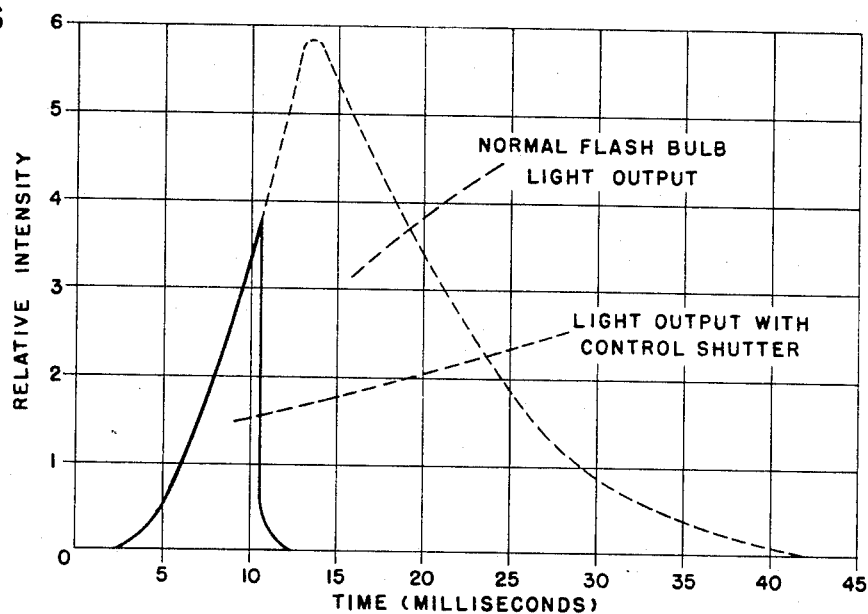
FIG. 6 is a graph illustrating the operation of the control shutter in accordance with the present invention.
Figure 7:
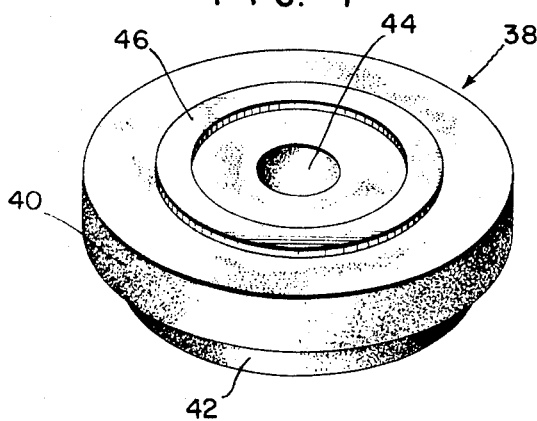
Figure 8:
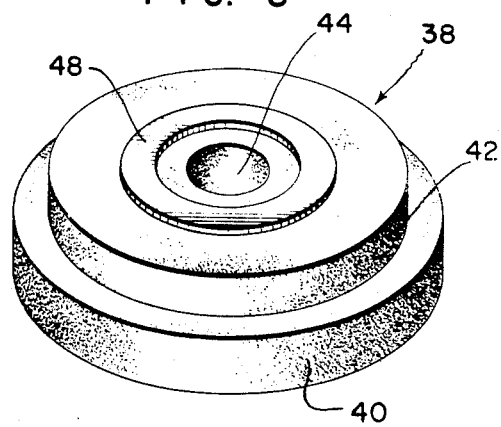

This principle is illustrated in FIG. 6. FIG. 6 is a graph showing time in milliseconds as abscissa and relative intensity of the light as ordinate. In a typical flash bulb, the light output builds up in intensity, from a time about two and a half milliseconds after actuation, to peak at about 14 milliseconds, and then a progressive decay to about 42½ milliseconds. Thus, the light output of the flashbulb covers a period of about 40 milliseconds. This characteristic is shown in the larger partially dotted curve. In the illustration shown in FIG. 6, the control signal produced as a result of the integration of the reflected light is assumed to have initiated the actuation of the shutter at time 10 milliseconds. Within one millisecond, the effective light output from the flash bulb has been substantially completely blocked. Although the incendiary or incandescent element in the flash bulb is not extinguished, the remaining portion of the light under the dotted portion of the curve is ineffective to illuminate the object of the photograph.

FIGS. 7 through 15 illustrate the various steps in the production of a preferred embodiment of the present invention. This preferred embodiment features, as hereinbefore mentioned, a pyrotechnic element 36 which includes a combination of a deflagrating substance and a dispersion substance such as that described in connection with FIG. 5. Beginning with the pyrotechnic element, the base structure is an annular disc or button 38 made of a suitable ceramic material. This disc or button may be on the order of 0.150 inch in diameter and on the order of 0.040 inch thick. A portion of the thickness adjacent one of the flat faces of the disc is of smaller diameter than the other portion, the smaller diameter being of the order of 0.120 inch. This produces a button having two substantially cylindrical concentric surfaces. The button also is provided with a central aperture 44 on the order of 0.030 inch in diameter. By silk screen technique, an annulus of resist material 46 is deposited on the larger of the two flat surfaces. Next, a similar annulus 48 of resist material is deposited, through silk screen techniques, to the opposite flat surface of the button.

After the two annuli have been deposited, the discs or buttons 38 are subjected to one or more plating processes. Preferably, the buttons are subjected to a first plating process which is the technique known as electroless plating. Next they are subjected to a second plating process such as electro-plating. This plating process produces an electrically conductive shell entirely surrounding the ceramic disc except for those areas where the resist annuli are positioned. Subsequent to the plating process the resist material is removed from the disc 38 by a suitable solvent and the central aperture 44 is plugged, as by solder. The resultant of the process thus far is a button having two electrically isolated conductive surfaces 50 and 52 respectively. As may be seen most clearly in FIGS. 11 and 14, the conductive surface 50 extends around the outer portion of the button with respect to the two annular grooves 54 and 56, respectively, left by the removal of the resist material; while the conductive surface 52 is plated through the hole or aperture 44 and extending over the two flat surfaces to the inner edge of the grooves defined by the removal of the resist material. These two conductive surfaces comprise a pair of electrodes or contacts for the pyrotechnic element 36.

Figure 11:
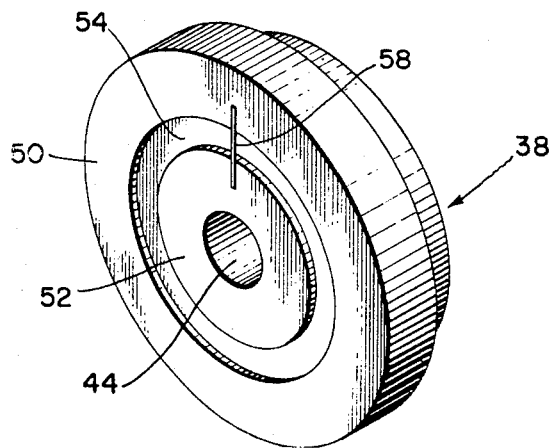

An incandescent bridge member is secured to the larger face of the button, bridging the groove 54. This incandescent bridge may be either a small piece of wire, such as Nichrome, 0.001 inch in diameter welded to the two electrodes 50 and 52, as shown in FIG. 11, or it may be applied by vacuum depositing techniques such as sputtering illustrated in FIGS. 9 and 10. FIG. 10 is an enlarged fragmentary portion of the structure shown in FIG. 9. FIG. 9 a vacuum chamber is represented by a bell jar 60. Within the vacuum chamber there is positioned a first sputtering electrode 62 spaced from and parallel to a second electrode 64. The second electrode is in the form of a holder for a number of the plated discs. These discs are positioned in the holder electrode with the larger flat surface facing the electrode 62. Between the two electrodes, and closely adjacent the holder electrode 64 there is positioned an apertured mask 66 having a plurality of small longitudinal apertures 68 therethrough. These apertures are each dimensioned to correspond to the size of the desired bridge member 58. The apertures correspond in number and position with the discs held in the holder electrode 64. When the sputtering apparatus is actuated, metal from the sputtering electrode 62 is deposited through the apertures 68 onto the surface of the disc or buttons 38 in a position to bridge the groove 54.

After the bridge 58 has been deposited, the holder electrode is removed from the vacuum chamber 60 and the mask 66 is removed from the face of the discs 38. The discs 38 however, are left in the holder 64 and subjected to a further silk screen deposition process. In this step of the preparation, a small quantity of deflagrating material is deposited directly over the incandescent bridge 58. In FIGS. 13 and 14, there is shown a deposit of such deflagrating material 70. In a preferred construction, the deflagrating material was lead styphnate. The deposited deflagrating material 70 is then dried.

From a thin sheet of suitable thermoplastic material, a first bubble is formed to constitute the outer shell of a capsule member. In FIG. 12 there is shown such an outer bubble 72 having a domed portion 74, a shoulder portion 76 and a skirt portion 78. In a similar manner a second or inner bubble or shell 80 is formed in a second sheet of plastic material. The inner bubble is also formed with a dome portion, a shoulder portion and a skirt portion. However, the domed portion of the inner bubble is substantially shallower than the domed portion of the outer bubble. Similarly, the shoulder and skirt portion of the inner bubble are dimensioned to fit within the shoulder and skirt portion of the outer bubble. The outer bubble is placed in a suitable die 82, a quantity of dispersion material 84 is deposited in the outer bubble, and the inner bubble is superimposed in the second bubble and the shoulder and skirt portions of the two bubbles are sealed together, thereby encapsulating the dispersion material between the two domed portions of the bubbles. The dispersion material may comprise comminuted graphite, lamp black or other finely comminuted substances.

The capsules or pods thus formed are then placed in another die 86. The discs 38, prepared as hereinbefore set forth, are inserted in the capsules or pods with the larger flat surface, that surface bearing the deflagrating substance, resting on the shoulder portion of the capsules, the deflagrating substance itself lying within the chamber defined by the surface of the inner bubble or shell and the flat surface of the disc. In this position, the skirt portion of the capsule is folded over the edge of the larger cylindrical portion of the disc or button 38 and sealed to the button as shown in FIG. 13.

The resultant of the process thus far described is a complete pyrotechnic element 36 as shown in FIG. 14. The exposed portion of the conductive surface 50 becomes one electrical contact while the other exposed conductive surface 52 becomes a second electrical contact, these two contacts being electrically isolated from each other by the groove 56. This pyrotechnic element assembly may now be secured in a suitable recess in one of the side walls of the structure 8 shown in FIG. 5, and secured in place with the contacts exposed on the outside of the chamber defining means.

Referring now to FIG. 2, it may be seen that one of the contacts may be electrically connected to one of the terminals 33 while the other contact may be electrically connected to the other of the terminals 33. When, as hereinbefore described, the SCR is triggered into conduction, the capacitor 32 is discharged through the incandescing bridge member 58. The incandescence of the bridge member 58 ignites the deflagrating substance 70. The deflagration explosively ruptures the incapsulating bubbles 72 and 80 causing the dispersion material 84 to be scattered within the chamber defined by the transparent sheet members 34. This dispersion of the material 84 deposits a pyrotechnic residue on the inside surfaces of the two transparent sheet members 34 substantially blocking the transmission of light therethrough. It has been found in apparatus constructed in accordance with the hereindescribed structure, that the dispersed material floating within the chamber also contributes, supposedly by diffusion characteristics, to the obliteration of the passage of light through the shutter member 8.

Figure 15:
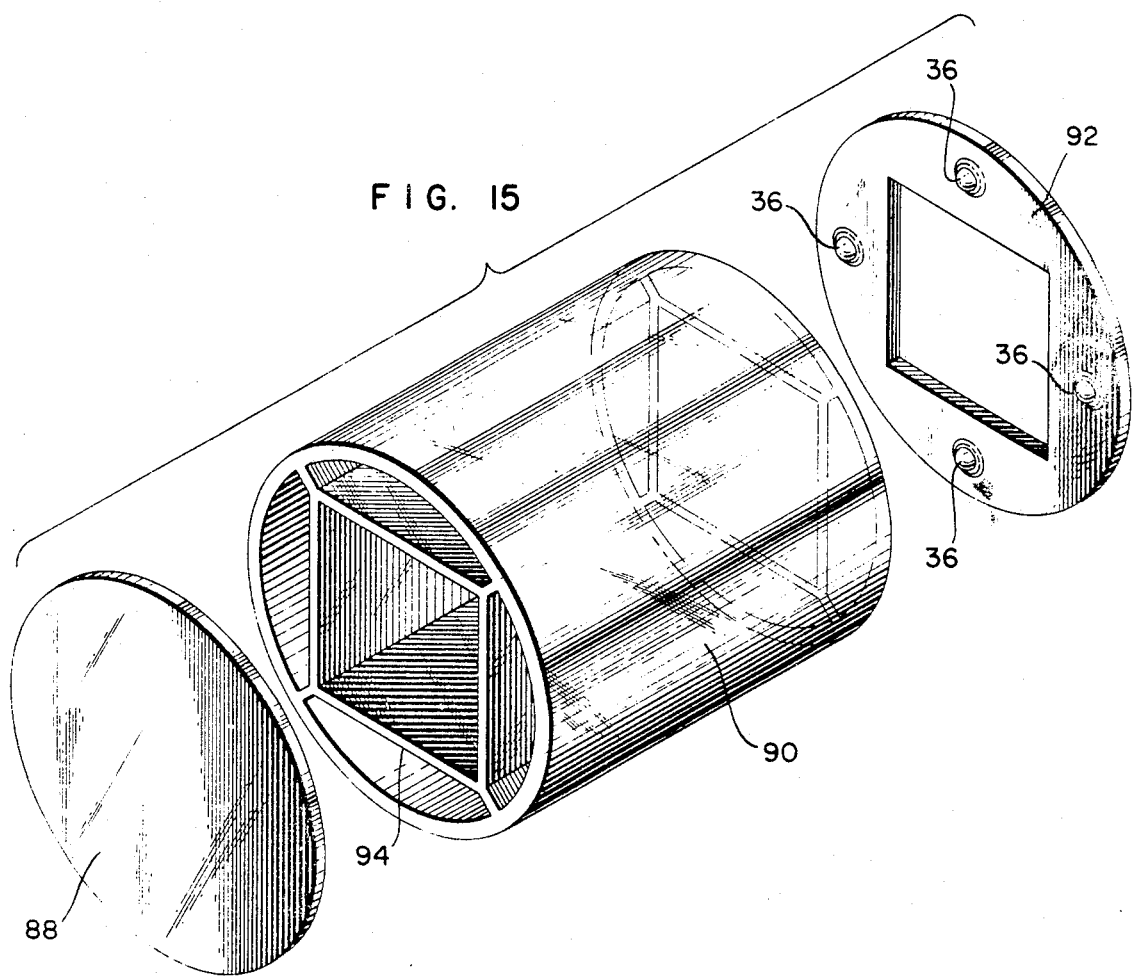

Since many of the cameras designed for use by tyro photographers are adapted for use with the multiple/element flash devices known as flash cubes, there is shown in FIG. 15, an embodiment of the invention corresponding to the flash cube concept. In effect, what is provided, is four of the shutter mechanisms such as that shown in FIG. 5 arranged in unique unitary structure. That unitary structure comprises a circular flat cap member 88, a cylindrical body portion 90 and a flat circular base member 92. Coextensive with and supported within the cylindrical body portion is a tube member 94 which is substantially square in cross section. The square tube is supported from the inner wall of the cylinderical body portion at each of the four corners of the square by support means of the type generally referred to as a spider. The entire structure of the body member including the cylindrical portion, the square tube, and the spider may be made as one integral part as by extrusion molding of a clear plastic. The end cap and base member may also be stamped from plastic, clear or otherwise. Four chambers are defined between the inner wall of the cylindrical member and the outer wall of the square tube. Each of these chambers corresponds to the chamber defined between the transparent members 34 of the shutter means 8 shown in FIG. 5. The cap member is sealed to one end of the body member 90. The base member 92 is provided with a central aperture 96 which is square and dimensionally matches the inner dimension of the square tube 94. Adjacent each of the straight sides of the square aperture, one of the pyrotechnic elements 36 is secured to the base member 92 with the contact members 50 and 52 being exposed on the opposite side of the base member. With these pyrotechnic elements in place, the base member is sealed to the opposite end of the body portion from the end cap 88, thus completely sealing the four peripheral chambers. Thus arranged, one of the pyrotechnic elements will be positioned within each of the four peripheral members. The central tube 94, however, is open at the end adjacent the pyrotechnic elements 36. The cross sectional dimension of the square tube is designated to be complementary of the dimension of the conventional flash cube. With the structure shown in FIG. 15 it is apparent that a conventional flash cube may be inserted within the square tube portion of the structure and if so inserted, would have one of the chambers to constitute the light obliterating shutter for each of the four faces of the flash cube. Conversely, the substance of the flash cube may be built into the inner square tube with the inner plastic tube 94 comprising the plastic windows of the cube itself.

Thus, it may be seen, that there has been provided, in accordance with the present invention, an improved photoflash control means which automatically controls the amount of light emanating from flash bulb to illuminate the object of a photograph after a time interval determined by the demand of the conditions.

The embodiments of the invention in which an exclusive property or privilege is claimed are defined as follows:

1. In a photoflash system wherein an object to be photographed is illuminated by a flash bulb, the improvement comprising shutter means in the form of a pyrotechnic device positioned between said flash bulb and said object, and means responsive to a predetermined amount of light reflected from said object to actuate said shutter, said shutter being operable to interrupt the flow of light from said flash bulb toward said object.

2. The invention as set forth in claim 1 wherein said pyrotechnic device comprises a vaporizable metallic element positioned to deposit, when actuated, a light obscuring coating on the surface of the envelope of said flash bulb.

3. The invention as set forth in claim 1 wherein said shutter means includes a normally transparent member positioned in the light path between flash bulb and said object, and wherein said pyrotechnic device comprises means rendering said transparent member non-transparent.

4. The invention as set forth in claim 3 wherein said pyrotechnic device comprises a vaporizable metallic element postioned to deposit, when actuated, a light obscuring coating on the surface of said transparent member.

5. The invention as set forth in claim 3 wherein said pyrotechnic device comprises a deflagrating element positioned to deposit, when actuated, a light obscuring residue on the surface of said transparent member.

6. The invention as set forth in claim 3 wherein said transparent member comprises a first and a second transparent element defining two opposite faces of a closed chamber, and wherein said pyrotechnic device is positioned between said transparent elements and includes means for discharging, when actuated, a pyrotechnic residue throughout said chamber substantially blocking the passage of light therethrough.

7. The invention as set forth in claim 6 wherein said pyrotechnic device includes a deflagrating element and a pod of dispersible comminuted particles, said pod being sealed over said deflagrating element whereby said deflagrating element when actuated, ruptures said pod, dispersing said particles into said chamber as said pyrotechnic residue.

8. The invention as set forth in claim 7 wherein said means responsive to light includes a photoelectric element and an electric control signal generating circuit, said pyrotechnic device being responsive to a control signal generated by said circuit for actuation thereof.

References Cited

UNITED STATES PATENTS

| | | | |
|---|---|---|---|
| 2,571,607 | 10/1951 | Pipkin et al. | 431—94 |
| 3,350,602 | 10/1967 | Erickson | 315—151 |
| 3,360,328 | 12/1967 | Pike | 350—269 |
| 3,389,259 | 6/1968 | Zarem et al. | 250—201 |
| 3,456,101 | 7/1969 | Rentschler et al. | 431—93 X |

JAMES W. LAWRENCE, Primary Examiner

E. R. LA ROCHE, Assistant Examiner

U.S. Cl. X. R.

95—53; 240—1.3; 250—217; 313—117; 350—269; 431—95